United States Patent [19]
Kotschy

[11] 3,786,324
[45] Jan. 15, 1974

[54] CAPACITOR WITH DECREASED FLAMMABILITY

[76] Inventor: Josef Kotschy, Kreillerstrasse 68, Munich, Germany

[22] Filed: May 4, 1973

[21] Appl. No.: 357,326

[30] Foreign Application Priority Data
May 9, 1972   Germany................... P 22 22 699.9

[52] U.S. Cl...................... 317/258, 252/8.1, 252/66
[51] Int. Cl............................................. H01g 3/215
[58] Field of Search........................... 317/258, 260; 252/66

[56] References Cited
UNITED STATES PATENTS
2,433,729   12/1947   Bennett............................ 252/66 X Primary Examiner—E. A. Goldberg
Attorney—Carlton Hill et al.

[57]   ABSTRACT

A capacitor of the regenerative type having decreased flammability. The capacitor employs as the dielectric fluid a hydrocarbon to which has been added a mixture of perfluorinated hydrocarbons.

18 Claims, 3 Drawing Figures

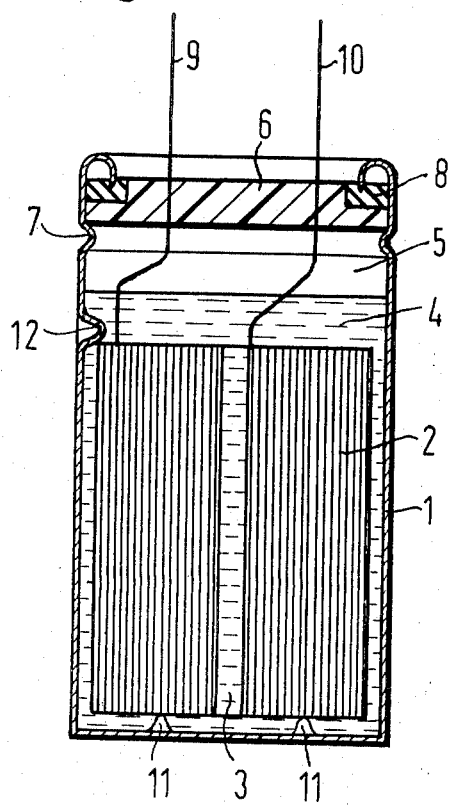

CAPACITOR WITH DECREASED FLAMMABILITY

BACKGROUND

1. Field of the Invention

This invention relates to electrical capacitors and especially to regenerative capacitors using hydrocarbon liquid impregnating agents containing a relatively small amount of a perfluorinated hydrocarbon mixture.

2. Prior Art

Liquid impregnated, regenerative type capacitors are subject to use conditions under which the capacitor interior experiences inflammatory conditions from sparks and/or heat. While the danger of fire in non-regenerating condensers can be very substantially reduced by using relatively inexpensive, non-, or almost non-flammable, impregnating substances containing chlorine (such as chlorinated diphenyls), such substances cannot be used in regenerative-type capacitors because the disintegration products from such substances produced by discharge and regeneration cycles in regenerative type capacitors so severely and adversely affects electrical properties of such capacitors that they can be rendered inoperative after only one or a few such cycles.

Fluorinated hydrocarbons may be used advantageously in regenerative type capacitors in place of chlorinated hydrocarbons, but such materials presently generally are commonly at least about 100 to 300 times more expensive than the older, non-halogenated capacitor impregnating organic liquids which limits their practical usage in regenerative capacitors.

In an effort to reduce the flammability characteristics of regenerative capacitors and still use largely only conventional impregnating fluids, it has heretofore been proposed to add a relatively small amount of a perfluorinated hydrocarbon type material to a non-halogenated hydrocarbon-type dielectric impregnating fluid. The resulting two-component mixture has reduced flammability characteristics compared to such a conventional hydrocarbon fluid used alone. Such a resulting mixture, however, has been found to suffer from the very real and significant disadvantage that inflammability of such mixture is only decreased over a limited temperature range for a limited time, apparently because the vapor pressure of the fluorocarbon additive is a function of temperature. The obvious technique of overcoming this disadvantage through addition of larger amounts of fluorocarbon additive is economically impractical.

There has now been discovered, however, a technique which unexpectedly and surprisingly enables one to reduce flammability of a conventional type dielectric impregnating fluid for relatively prolonged periods of time over relatively large temperature ranges. This technique involves adding to such a conventional impregnating fluid a mixture of two different types of fluorocarbon materials. The amount of such mixture employed in any given such product fluid composition may be relatively small which makes the technique economically practical. The overall reduction in flammability characteristics thus achieved by adding such a mixture to a conventional impregnating fluid is greater than that achieved by using either of the two types of fluorocarbon materials alone in equivalent amounts under comparable conditions with such a conventional fluid. Indeed, the coaction between the component fluorocarbon material types in such a mixture in admixture with such a conventional impregnating fluid in regenerative capacitor use environments is such that a synergistic effect can be considered to be involved.

The result is a new and improved class of regenerative capacitors using such fluids which have highly desirable flammability characteristics compared to prior art capacitors employing only conventional hydrocarbon type impregnating fluids alone or in combination with a single fluorocarbon material.

SUMMARY OF THE INVENTION

This invention is directed to a capacitor of the regenerative type adapted to have decreased inflammability. This capacitor has a gas tight and liquid tight housing. In this housing, there is positioned at least one capacitive element. Each capacitive element in the housing comprises alternate, wound layers of a dielectricum sheet member comprising a synthetic material such as polyolefin interposed between a pair of electrically conductive sheet members, each conducting sheet member comprising a metalized paper sheet of which at least one is regenerable.

Spacer means are provided which are adapted to maintain the capacitive element or elements in spaced, electrically separate relationship to said housing.

A pair of electrical current conduit means are provided which both pass through such housing. One of such conduit means interconnects, in each capacitive element, with one of such conductive sheet members, while the other of such conduit means interconnects, in each capacitive element, with the other of such conductive sheet members.

A dielectric fluid adapted to impregnate such electrically conductive sheet members in each such capacitive element is present within such housing. Such fluid is so present in a quantity at least sufficient to impregnate and to surround such capacitive element or elements and also to form an excess thereabove with a vapor space above the level of such fluid in said housing when said capacitor is in a functional position spatially. The vapor space is saturated with the vapors of said fluid, as those skilled in the art will appreciate.

In a capacitor, each such capacitive element is adapted for self regeneration of its capacitive capability in the event of a failure thereof in response to electrical energy applied to said conduit means.

The dielectric fluid itself comprises in homogeneous combination a mixture of a hydrocarbon liquid with a relatively small amount of a perfluorinated fluorocarbon liquid mixture. Thus, the hydrocarbon liquid has a boiling point in the range of from about 250° to 300°C. Preferred examples of such a liquid include mineral oil (which here most preferably comprises about 56% paraffinic constituents, about 29% napthalenic constituents, and about 15% aromatic constituents), dodecylbenzene, dioctylsebacate, and the like.

The liquid fluorocarbon mixture comprises at least one first fluorocarbon selected from the group consisting of trifluoromethyl perfluorohydrooxazine and perfluorinated dimethylcyclohexane, and at least one second fluorocarbon selected from the group consisting of a perfluoroalkylpolyether which has a boiling point of about 152°C., a perfluoroalkylpolyether which has a boiling point of about 194°C., and trifluoromethyl perfluorodecalin. In a given such fluorocarbon mixture, the weight ratio of said first fluorocarbon to said second fluorocarbon lies in the range of from about 0.65 : 1 to 1.3 : 0.5.

In a given such fluid, the weight ratio of such fluorocarbon mixture to such hydrocarbon mixture lies in the range from about 0.00025 : 1 to 0.1 : 1, provided that this ratio, in any given said fluid, is such that, in a capacitor of this invention, the duration of combustion protection is at least about 5 seconds at each of about 250°C. and about 300°C.

DESCRIPTION OF THE DRAWINGS

In the drawings:

FIG. 3 is a side elevational, diagrammatic, schematic view of an embodiment of a regenerative condensor utilizing the principles of the present invention.

DETAILED DESCRIPTION

Figure 1:
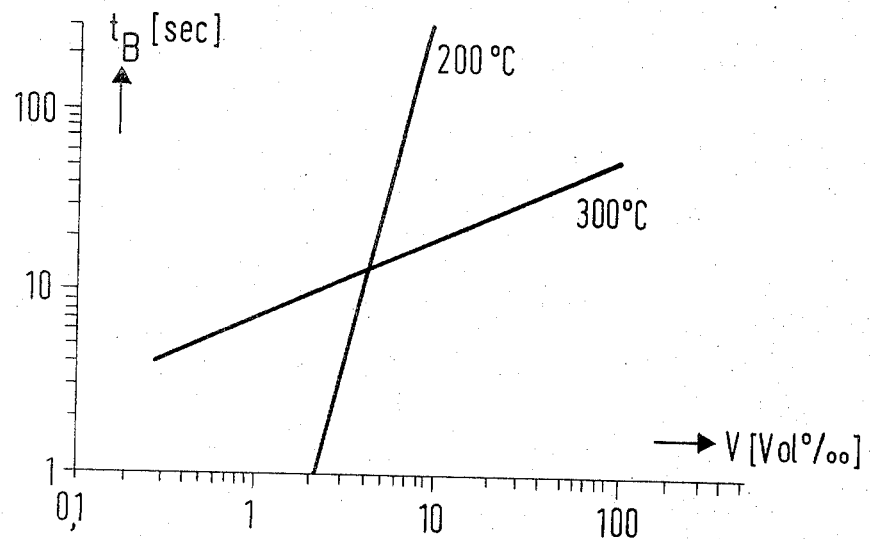
FIG. 1 illustrates the combustion protection duration $t_B$ in seconds for a mineral oil of approximately 56 weight percent paraffinic components, 29 weight percent naphthalenic components, and 15 weight percent aromatic components admixed with varying amounts of trifluoromethyl perfluorodecalin of each of two different temperatures, namely 200°C. and 300°C.

Referring to FIG. 1, it is seen that the additional amount of trifluoromethyl perfluorodecalin needed for a short combustion protection $T_B$ becomes lower as the temperature of the impregnation fluid increases. Therefore, for a combustion protection duration of, for instance, about five seconds at about 200°C., three Vol per mil is required; however, at about 300°C. only 0.3 Vol per mil of such additional liquid is required. Totally different conditions prevail if a longer combustion protection duration $t_B$ is required. For a protection time of, for instance, approximately 60 seconds at a temperature of about 200°C., an addition of six Vol per mil is required while at about 300°C. an addition of 100 Vol per mil is required. The different attitudes can be traced back to the fact that, for a short term protection effect, the temperature dependency of the vapor pressure of the additional liquid is determinative, whereas the protective duration for a longer term protective effect is limited by the evaporation speed. As can be seen from FIG. 1, for the effective combustion protection of mineral oil insulation liquid even at low temperatures, considerable amounts of the non-flammable substance trifluoromethyl perfluorodecalin are required.

A number of further perfluorinated liquids with boiling points within the range from 50° to 195°C. were examined individually as regards their ability to reduce the flammability of insulation oil. These included N-trifluoromethyl perfluorohydrooxazine, perfluorinated 1,4-dimethylcyclohexane, and two perfluoroalkylpolyethers, one with a boiling point of 152°C., the other, 194°C., as well as the already mentioned 1-trifluoromethyl perfluorodecalin. The following Table 1 shows the minimum amounts $V_{min}$ of these perfluorinated liquids needed to avoid inflammation of a mineral oil comprising approximately 56 weight percent paraffinic parts, 29 weight percent naphthalenic parts and 15 weight percent aromatic parts for a combustion protection duration of 5 seconds in the range of 200° to 300°C.

As can be seen from Table 1, the additional amount of perfluorinated compound needed for avoidance of inflammation (combustion) becomes larger the lower the temperature of the insulation oil and the higher the boiling point of the perfluorinated liquid.

The combustion protection time $t_B$ for the same mineral oil as used in Table 1 mixed with specified perfluorinated liquid at the rate of 10 Vol per mil in the temperature range of 200° to 300°C. is shown in the following Table 2.

As can be seen from Table 2, the combustion protection duration $t_B$ decreases with increasing temperature of the mineral insulation oil at a constant content of perfluorinated liquid. For some substances, however, it is found that the combustion protection duration increases with rising boiling point whereas such value here decreases for the perfluoroalkylpolyether with a boiling point of 194°C. This is perhaps caused by the fact that fewer molecules of the latter material go into the vapor phase than with the former such materials as the boiling point rises with the result that the combustion protection duration decreases for the latter material at some temperature.

Figure 2:
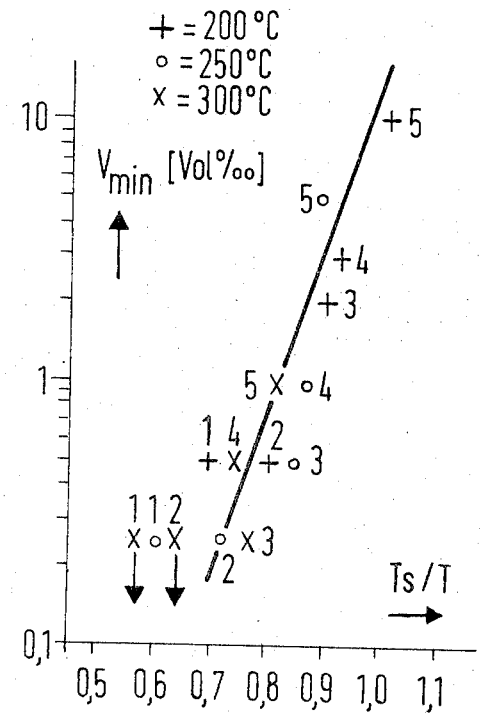
FIG. 2 shows the minimum amount $V_{min}$ of perfluorinated liquid needed for combustion protection of mineral oil of the type used in FIG. 1 compared to the ratio $T_s/T$ where $T_s$ is the boiling temperature of perfluorinated liquid and T that of the mineral oil.

FIG. 2 shows the minimum amounts ($V_{min}$) of added perfluorinated material needed to guarantee a combustion protection of 5 seconds for various perfluorinated materials logarithmically expressed as function of the reciprocal value of the ratio of mineral oil temperature T to the boiling temperature $T_s$ of the respective added perfluorinated liquid. The vaious added perfluorinated liquids are provided with the numerals 1 to 5 which corresponds to the compound designations used Tables 1 and 2. As FIG. 2 demonstrates, the measured points for mixtures of mineral oil with perfluorinated liquid lies approximately on the straight line represented by the equation:

$$\ln V_{min} = \text{const.} (T_s/T). \quad (1)$$

It follows from FIG. 2 that in order to achieve an equivalent result, the additional amount of added perfluorinated liquid has to be larger, the higher the boiling point $T_s$ of the added perfluorinated compound and the lower the boiling temperature T of the impregnating liquid (here mineral oil). In the case where T equals $T_s$, this means that if the boiling temperature $T_s$ of the perfluorinated compound and the boiling temperature T of the impregnating liquid are equal, approximately 10 Vol per mil of the protective substance (here perfluorinated hydrocarbon) is required for a combustion protection duration of 5 seconds. It is also learned from FIG. 2, that, in case of a perfluorinated liquid which boils at about 0.8 times the amount of the boiling temperature T of the impregnating liquid, only an additional amount of about 1 Vol per mil of perfluorinated liquid is required to achieve the same combustion duration protection.

It seems at first as though $T_s$ should be chosen as low as possible in order to achieve as low an additional amount as possible. However, it should be taken into consideration that the evaporation speed strongly increases if the boiling point $T_s$ of the perfluorinated additional liquid lies considerably below the boiling temperature T of the impregnating liquid. This, however, means that, when a capacitor is destroyed, the combustion protection duration becomes lower the smaller the ratio $T_s/T$.

For economic reasons, the combustion avoidance of the impregnation agent should be achieved with as little additional amounts of a perfluorinated liquid as possible. However, with only one substance according to the above described facts this cannot always be sufficiently realized since liquids with a low boiling point do guarantee already at a low concentration a sufficient vapor density but evaporate at high temperature with too much speed so that a sufficient combustion protection duration for a capacitor is not guaranteed. Liquids with higher boiling points have too low a vapor pressure at low temperatures to guarantee a sufficient protection duration for commercial practicality. Therefore, in accordance with the discovery of the present invention, it is advantageous to add a mixture of two different types of perfluorinated liquids each type having a different boiling temperature $T_s$, to a hydrocarbon liquid used to impregnate a regenerative capacitor. Thus, for example, when as the lower boiling perfluorinated compound one uses N-trifluoromethyl perfluorohydrooxazine (boiling point 50° to 60°C.) and as the higher boiling perfluorinated compound one uses trifluoromethyl perfluorodecalin (boiling point 160°C.) and adds the mixture to a mineral insulation oil of the type hereinabove described, the combustion point of this mineral oil, which normally has a combustion point of about 185°C. and a (boiling) vaporization point of about 300°C., is unexpectedly raised and the combustion protection time is unexpectedly expanded.

As can further be learned from Table 1, the minimum protective amount $V_{min}$ which guarantees a combustion protection time $t_B$ of 5 seconds in an impregnating fluid mixture using trifluoromethyl perfluorohydrooxazine at an oil temperature of about 200°C. is about 0.5 Vol per mil of mineral oil hydrocarbon liquid. Also, 0.5 Vol per mil of trifluoromethyl perfluorodecalin with mineral oil is required in order to guarantee at about 300°C. the same combustion protection time $t_B$. The ratio of the two respective perfluorinated liquids is in this case 1 to 1. If other inflammable liquids or other hydrocarbon liquid impregnating fluids, are used, it will be appreciated that the optimum amount of perfluorinated liquid added to hydrocarbon liquid will vary, depending on circumstances, such as the liquids involved, and the amount of combustion protection duration desired, and the like, so that it is not here possible to give a simple indication of relative amounts that will be applicable to all the use situations contemplated by the teachings of the present invention.

If, for instance, a hydrocarbon liquid is used whose combustion point lies at a lower temperature than that of the above mentioned mineral insulation oil, that is, lower than about 185°C., it is advisable, if one is using the same perfluorinated hydrocarbons, such as trifluoromethylperfluorohydrooxazin and trifluoromethylperfluorodecalin, to add more of the lower boiling perfluorinated hydrocarbon; for example, up to a ratio of the two liquids 1.5 : 0.5 of substituted oxazine to substituted decalin. The reverse applies if the hydrocarbon liquid has a higher combustion point than about 185°C. in which case, if one likewise uses these same liquids, it is advisable to use more of the less volatile substance (here the substituted decalin), as in a ratio of 0.65 : 1.3 of substituted oxazine to substituted decalin.

Decisive for the duration of the combustion protection is the amount of perfluorinated liquid which is added to the hydrocarbon liquid. The desired combustion protection duration $t_B$ for a given capacitor depends on the application purpose of that capacitor. Thus, for example, if several seconds only are desired, it is sufficient that the total of the amounts of the two liquids (the substituted oxazine and the substituted decalin) be present with the hydrocarbon liquid at a ratio as low as about 0.00025 : 1. For longer protective times, it can be necessary to extend this ratio up to 0.1 : 1 or even higher, depending on the use conditions.

Turning to FIG. 3, there is seen an exemplary embodiment of a regenerative capacitor incorporating the principles of the invention. A capacitor 1 includes a cup shaped housing or container means 1 having wound capacitor elements 2 positioned in working relation therein. The capacitor elements 2 include wound, alternating layers of metal foil electrode and impregnated intermediate layers and/or dielectric layers. The wound capacitor elements 2 have a central core hole 3. An impregnating fluid mixture 4 completely surrounds the capacitor elements 2 and forms an excess above the capacitor elements. Area 5 above the impregnating liquid comprises the vapor space and is saturated with the vapors of the impregnating liquid 4.

The housing means is sealed with the cover member 6. A sealing ring 8 is provided along the peripheral edges of cover member 6 and is biased against the cover member. Flange-like portions 7 of the housing means 1a maintain the sealing ring 8 and cover member 6 in substantially vapor impermeable relation on the housing. Electrical current conduits of opposite polarity 9 and 10 are passed through the cover member 6 for connection to electrical circuitry as desired. The wound capacitor elements 2 are supported from the buttom of housing means 1 by cam-like members 11 and and are held in spaced relation from the wall thereof by a lateral cam-like member 12. Of course, except for the impregnating fluid, other regenerative capacitor constructions may also be utilized as those skilled in the art will appreciate in practicing the present invention. For example, cam-like member 12 may comprise a plurality of such cam-like members, as well as other suitable reinforcement means. Whatever means are utilized to position the wound capacitor elements in a working relation within a housing means, the impregnating liquid or impregnating liquid mixture must be capable of omnidirectional envelopment of the capacitor elements.

In a capacitor 1, each capacitive element typically utilizes as a dielectric layer a polyolefin film, preferably a polypropylene film, on either face of which is located a metallized paper web or sheet. These three layers, or "foils," are spirally wound together to form the desired element. The conducting wires are then mounted on each one of the metallized webs.

The impregnating dielectrical fluid saturates the paper sheet members so that small amounts of the impregnating fluid leak into the polyolefin oil through the thin metallized sheet members and makes the polyolefin foil swell. By means of such swelling such foil conforms to the metallized paper webs closely so that there is achieved a capacitor having a high dielectric strength. The virtual absence of air spaces between the layers also prevents the development of undesirable stray voltages. Range spaces are not necessary.

In general, preferred hydrocarbon liquids for use in the present invention have a combustion point in the range from about 140° to 270°C. Also, preferably a given perfluorinated liquid, which is used in combination with a particular hydrocarbon liquid in accordance with the teachings of this invention, has a boiling point which is at least about 50°C. lower than the boiling point of that hydrocarbon liquid, and, more preferably, about 100°C lower. In general, any hydrocarbon liquid having a boiling point in the range indicated, and also having a combustion point in the range indicated, may be used in the practice of the present invention, as those skilled in the art will appreciate, although preferably a hydrocarbon liquid has a dielectric constant in the range of from about 1.7 to 3.8, as shown in the Examples. The term "hydrocarbon" as used herein in reference to an impregnating liquid adapted for use in regenerative capacitors, as those skilled in the art will appreciate, is employed in its broad generic sense to connote any organic compound having characteristics as indicated, which comprises carbon and hydrogen, and which may also contain oxygen, as for example, in the form of ether linkages, carbonyl groupings, or the like.

Those skilled in the art will appreciate that by suitable selection of hydrocarbon liquid and liquid fluorocarbon mixture, in accordance with the teachings of this invention, the duration of combustion protection of at least about 5 seconds can be broadened so that the protection temperature range for such 5 second interval can be extended outwardly below 250°C. Thus, for instance, in Example 2 below, this range goes down to 180°C while, in Example 1, this range goes down to 150°C.

A combustion protection duration of at least about 5 seconds at each of 150°C and 300°C is thus achieved by using as the dielectric fluid one wherein the hydrocarbon liquid is dodecylbenzene, the liquid fluorocarbon mixture comprises as said first fluorocarbon trifluoromethyl perfluorohydrooxazine, and said second fluorocarbon is selected from the group consisting of a perfluoroalkylpolyether which has a boiling point of about 152°C and trifluoromethyl perfluorodecaline.

Similarly, combustion protection duration of at least about 5 seconds at each of about 250°C and about 300°C is thus achieved by using as the dielectric fluid one wherein the hydrocarbon liquid is dioctylsebacate, and the liquid fluorocarbon mixture comprises as said first fluorocarbon perfluorinated dimethylcyclohexane and said second fluorocarbon is selected from the group consisting of a perfluoroalkylpolyether which has a boiling point of about 152°C. and a perfluoroalkylpolyether which has a boiling point of about 194°C.

Preferably, in a capacitor of this invention, the following dielectric fluid systems may be used:

A. A fluid wherein said first fluorocarbon is N-trifluoromethyl perfluorohydrooxazine and said second fluorocarbon is a perfluoroalkylpolyether which has a boiling point of about 152°C.

B. A fluid wherein said first fluorocarbon is trifluoromethyl perfluorohydrooxazine and said second fluorocarbon is a perfluoroalkylpolyether which has a boiling point of about 194°C.

C. A fluid wherein said first fluorocarbon is trifluoromethyl perfluorohydrooxazine and said second fluorocarbon is trifluoromethyl perfluorohydrooxazine.

D. A fluid wherein said first fluorocarbon is perfluorinated 1.4- dimethylcyclohexane and said second fluorocarbon is a perfluoroalkylpolyether which has a boiling point of about 152°C.

E. A fluid wherein said first fluorocarbon is perfluorinated 1.4 dimethylcyclohexane and said second fluorocarbon is a perfluoroalkylpolyether which has a boiling point of about 194°C., and F. A fluid wherein said first fluorocarbon is perfluorinated 1.4- dimethylcyclohexane and said second fluorocarbon is trifluoromethyl perfluorodecalin.

EMBODIMENTS

The present invention is further illustrated by reference to the following examples. Those skilled in the art will appreciate that other and further embodiments are obvious and within the spirit and scope of this invention from the teachings of these present examples taken with the accompanying specification and drawings. All parts are parts by weight, unless others were indicated.

In the present examples, as well as elsewhere in the present invention, the term "combustion point" is determined by the technique of Pensky Martens and is defined in DIN (German Industrial Standard) 51758.

Similarly, in the present examples, as well as elsewhere in the present invention, the term "combustion protection duration" (herein sometimes abbreviated by the symbol $t_B$) is determined also by the Pensky Martens technique (defined in same DIN Standard). Time is here taken as the interval which passes after the opening of the capacitor container until combustion occurs. During this interval, the temperature is recorded.

EXAMPLE 1

A flame-retarded, dielectric impregnating fluid is prepared by mixing together to form a single phase liquid the following material (on a 100 weight percent total fluid composition basis):

| Component | Wt. % |
|---|---|
| 1. dodecylbenzene | 99.8 |
| 2. N-trifluoromethyl perfluorooxazine | 0.1 |
| 3. perfluoroalkylpolyether (boiling point 152°C) | 0.1 |

When the fluid is used as the impregnating dielectric fluid in a capacitor of the type illustrated in FIG. 3, the capacitor displays a combustion protection time $t_B$ of about 10 seconds in the temperature range of from about 150° to 300°C.

Component 3) used in this Example has the structure:

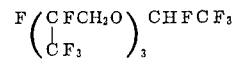

and its molecular weight is about 618, its boiling point is about 152°C. and its relative dielectric constant is about 2.6. This material is substantially non-combustible.

Component 2) has a molecular weight of about 299, a boiling point of 50°–60°C. and a relative dielectric constant of about 1.8. This material is substantially non-combustible.

Component 1) has a combustion point of about 142°C., a boiling point of about 280°–300°C., and a relative dielectric constant of about 1.8.

EXAMPLE 2

A flame-retarded, dielectric impregnating fluid is prepared by mixing together to form a single phase liquid the following materials (on a 100 weight percent total fluid composition basis):

| Component | Wt. % |
|---|---|
| 1. mineral oil | 99.8 |
| 2. perfluorinated 1,4-dimethylcyclohexane | 0.1 |
| 3. 1-trifluoromethyl perfluorodecalin | 0.1 |

When this fluid is charged as the impregnating dielectric fluid in a capacitor of the type illustrated in FIG. 3, the capacitor displays a combustion protection time $t_B$ of about 10 seconds in the temperature range of from about 180° to 300°C.

Component 3) has a molecular weight of about 512, a boiling point of about 160°C., and a relative dielectric constant of about 2.0. This material is substantially non-combustible.

Component 2) has a molecular weight of about 400, a boiling point of about 102°C and a relative dielectric constant of about 1.9.

Component 1) contains about 56 weight percent paraffinic hydrocarbons, about 29 weight percent naphthalenic hydrocarbons, and about 15 weight percent aromatic hydrocarbons. This component has a combustion point of about 185°C., a boiling point of about 300°C., and a relative dielectric constant of about 2.2.

EXAMPLE 3

A flame retarded, dielectric impregnating fluid is prepared by mixing together to form a single phase liquid the following materials

| Component | Wt. % |
|---|---|
| 1. dioctylsebacate | 99.8 |
| 2. perfluorinated 1,4-dimethylcyclohexane | 0.1 |
| 3. perfluoroalkylpolyether (boiling point 194°C) | 0.1 |

When this fluid is charged as the impregnating dielectric fluid in a capacitor of this type illustrated in FIG. 3, the capacitor displays a combustion protection time $t_B$ of about 10 seconds in the temperature range of from about 250° to 300°C.

The component 3) used in this Example has the structure:

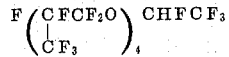

and its molecular weight is about 784, its boiling point is about 194°C., and its dielectric constant is about 2.0. This material is substantially non-combustible.

The characteristics of component 2) used in this Example are as described in Example 2.

Component 1) used in this Example has a boiling point somewhat over about 350°C. and a combustion point of about 265°C.

TABLE 1

| Perfluorinated Liquid | Boiling Point °C | $V_{min}$/Vol-o/oo (at indicated Oil temperature °C) | | |
|---|---|---|---|---|
| | | 200°C | 250°C | 300°C |
| Trifluoromethylperfluorohydrooxazine | 50–60 | 0.5 | 0.25 | 0.25 |
| Perfluorinated Dimethylcyclohexane | 102 | 0.5 | 0.25 | 0.25 |
| Perfluoroalkylpolyether | 152 | 2 | 0.5 | 0.25 |
| Trifluoromethylperfluorodecalin | 160 | 3 | 1 | 0.5 |
| Perfluoroalkylpolyether | 194 | 10 | 5 | 1 |

TABLE 2

| Perfluorinated Liquid | Boiling Point °C | $t_B$/sec at indicated Oil temperature °C | | |
|---|---|---|---|---|
| | | 200°C | 250°C | 300°C |
| Trifluoromethylperfluorohydrooxazine | 50–60 | 18 | 12 | |
| Perfluorinated Dimethylcyclohexane | 102 | 20 | 20 | 10 |
| Perfluoroalkylpolyether | 152 | 70 | 50 | 20 |
| Trifluoromethylperfluorodecalin | 160 | 320 | 80 | 22 |
| Perfluoroalkylpolyether | 194 | 45 | 12 | 8 |

The claims are:

1. A capacitor of the regenerative type adapted to have decreased inflammability comprising:

A. a gas tight and liquid tight housing,
   B. at least one capacitive element positioned in said housing each capacitive element comprising alternate wound layers of a dielectricum sheet member comprising polyolefin interposed between a pair of electrically conductive sheet members each comprising a metalized paper sheet, of which at least one is regenerable,
   C. spacer means adapted to maintain said capacitive element(s) in spaced, electrically separate relationship to said housing,
   D. a pair of electrical current conduit means passing through said housing, one of such conduit means interconnecting in each capacitive element with one of said conductive sheet members and the other of such conduit means interconnecting in each capacitive elment with the other of said conductive sheet members,
   E. a dielectric fluid adapted to impregnate said electrically conductive sheet members in each capacitive element and present within said housing in a quantity at least sufficient to impregnate and to surround said capacitive element(s) and also to form an excess thereabove with a vapor space above the level of such fluid in said housing when said capacitor is in a functional position spatially, said vapor space being saturated with the vapors of said fluid,
   F. each such capacitive element being adapted for self regeneration of its capacitive capability in the event of a failure thereof in response to electrical energy applied to said conduit means, and
   G. said fluid comprising in homogeneous combination 1. a hydrocarbon liquid having a boiling point in the range of from about 250° to 300°C., and having a combustion point in the range from about 140° to 270°C.,
2. a liquid fluorocarbon mixture comprising:
   a. at least one first fluorocarbon selected from the group consisting of trifluoromethyl perfluorohydrooxazine and perfluorinated dimethylcyclohexane,
   b. at least one second fluorocarbon selected from the group consisting of a perfluoroalkylpolyether which has a boiling point of about 152°C, a perfluoroalkylpolyether which has a boiling point of about 194°C, and trifluoromethyl perfluorodecalin,
   c. the weight ratio of said first fluorocarbon to said second fluorocarbon in any given said fluorocarbon mixture being in the range of from about 0.65 : 1 to 1.3 : 0.5,
3. the weight ratio of said fluorocarbon liquid to said hydrocarbon liquid being in the range from about 0.00025 : 1 to 0.1 : 1 with this ratio in any given said fluid being such that in said capacitor the duration of combustion protection is at least about 5 seconds at each of about 250°C. and about 300°C.

2. The capacitor of claim 1 wherein, in said fluid, the duration of combustion protection is at least about 5 seconds at each of about 180°C. and about 300°C.

3. The capacitor of claim 1 wherein, in said fluid, the hydrocarbon liquid is dodecylbenzene, the liquid fluorocarbon mixture comprises as said first fluorocarbon trifluoromethyl perfluorohydrooxazine, and said second fluorocarbon is selected from the group consisting of a perfluoroalkylpolyether which has a boiling point of about 152°C. and trifluoromethyl perfluorodecaline, and said ratio of said fluorocarbon mixture to said hydrocarbon mixture in any given said fluid being such that the duration of combustion protection is at least about 5 seconds at each of about 150°C. and about 300°C.

4. The capacitor of claim 1, in said fluid, the hydrocarbon liquid is dioctylsebacate, and the liquid fluorocarbon mixture comprises as said first fluorocarbon perfluorinated dimethylcyclohexane and said second fluorocarbon is selected from the group consisting of a perfluoroalpolyether which has a boiling point of about 152°C. and a perfluoroalkylpolyether which has a boiling point of about 194°C. and said ratio of said fluorocarbon mixture to said hydrocarbon mixture in any given said fluid being such that the duration of combustion protection is at least about 5 seconds at each of about 250°C. and 300°C.

5. The capacitor as defined in claim 1, wherein said first fluorocarbon is trifluoromethyl perfluorohydrooxazine and said second fluorocarbon is a perfluoroalkylpolyether which has a boiling point of about 152°C.

6. The capacitor as defined in claim 1, wherein said first fluorocarbon is trifluoromethyl perfluorohydrooxazine and said second fluorocarbon is a perfluoroalkylpolyether which has a boiling point of about 194°C.

7. The capacitor as defined in claim 1, wherein said first fluorocarbon is trifluoromethyl perfluorohydrooxazine and said second fluorocarbon is trifluoromethyl perfluorohydrooxazine.

8. The capacitor as defined in claim 1, wherein said first fluorocarbon is perfluorinated dimethylcyclohexane and said second fluorocarbon is a perfluoroalkylpolyether which has a boiling point of about 152°C.

9. The capacitor as defined in claim 1, wherein said first fluorocarbon is perfluorinated dimethylcyclohexane and said second fluorocarbon is a perfluoroalkylpolyether which has a boiling point of about 194° C.

10. The capacitor as defined in claim 1, wherein said first fluorocarbon is perfluorinated dimethylcyclohexane and said second fluorocarbon is a trifluoromethyl perfluorodecalin.

11. The capacitor as defined in claim 3, wherein said first fluorocarbon is trifluoromethyl perfluorohydrooxazine and said second fluorocarbon is a perfluoroalkylpolyether which has a boiling point of about 152°C.

12. The capacitor as defined in claim 3, wherein said first fluorocarbon is trifluoromethyl perfluorohydrooxazine and said second fluorocarbon is a trifluoromethyl perfluorodecalin.

13. The capacitor as defined in claim 3, wherein said first fluorocarbon is perfluorinated dimethylcyclohexane and said second fluorocarbon is a perfluoroalkylpolyether which has a boiling point of about 194°C.

14. The capacitor of claim 1, wherein said hydrocarbon liquid is selected from the group consisting of mineral oil, dodecylbenzene, and dioctylsebacate.

15. The capacitor of claim 14, wherein said mineral oil comprises, on a 100 weight percent total mineral oil basis, about 56 weight percent paraffinic constituents, about 29 weight of naphthalenic constituents, and about 15 weight percent aromatic constituents.

16. The capacitor of claim 1, wherein said hydrocarbon liquid is dioctyl sebacate.

17. The capacitor of claim 1, wherein said hydrocarbon liquid is dodecylbenzene.

18. The capacitor of claim 1, wherein said polyolefin is polypropylene.

* * * * *